United States Patent
SeyedzadehDelcheh et al.

(10) Patent No.: US 12,130,741 B2
(45) Date of Patent: Oct. 29, 2024

(54) RESOURCE-AWARE COMPRESSION

(71) Applicant: Advanced Micro Devices, Inc., Santa Clara, CA (US)

(72) Inventors: SeyedMohammad SeyedzadehDelcheh, Bellevue, WA (US); Shomit N. Das, Austin, TX (US); Bradford Michael Beckmann, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/058,534

(22) Filed: Nov. 23, 2022

(65) Prior Publication Data
US 2023/0110376 A1    Apr. 13, 2023

Related U.S. Application Data (63) Continuation of application No. 16/725,971, filed on Dec. 23, 2019, now Pat. No. 11,544,196.

(51) Int. Cl.
*G06F 12/02* (2006.01)
*G06F 11/30* (2006.01)
(Continued)

(52) U.S. Cl.
CPC ...... *G06F 12/0871* (2013.01); *G06F 11/3037* (2013.01); *G06F 12/0246* (2013.01); *G06F 12/0897* (2013.01); G06F 2212/401 (2013.01)

(58) Field of Classification Search
CPC ............. G06F 12/0871; G06F 11/3037; G06F 12/0246; G06F 12/0897; G06F 2212/401; G06F 12/02; G06F 12/08; Y02D 10/00
See application file for complete search history.

(56) References Cited

U.S. PATENT DOCUMENTS

| | | | |
|---|---|---|---|
| 7,587,572 B1 * | 9/2009 | Stenstrom | G06F 12/08 711/173 |
| 8,862,837 B1 * | 10/2014 | Marshak | G06F 12/0868 711/154 |

(Continued)

FOREIGN PATENT DOCUMENTS

| | | |
|---|---|---|
| WO | 0244902 A2 | 6/2002 |
| WO | 2014076743 A1 | 5/2014 |

OTHER PUBLICATIONS

A. R. Alameldeen and D. A. Wood, "Adaptive cache compression for high-performance processors," Proceedings. 31st Annual International Symposium on Computer Architecture, 2004., Munich, Germany, 2004, pp. 212-223.*

(Continued)

*Primary Examiner* — Pierre Michel Bataille
(74) *Attorney, Agent, or Firm* — Kowert, Hood, Munyon, Rankin & Goetzel, P.C.; Rory D. Rankin (57) ABSTRACT

Systems, apparatuses, and methods for implementing a multi-tiered approach to cache compression are disclosed. A cache includes a cache controller, light compressor, and heavy compressor. The decision on which compressor to use for compressing cache lines is made based on certain resource availability such as cache capacity or memory bandwidth. This allows the cache to opportunistically use complex algorithms for compression while limiting the adverse effects of high decompression latency on system performance. To address the above issue, the proposed design takes advantage of the heavy compressors for effectively reducing memory bandwidth in high bandwidth memory (HBM) interfaces as long as they do not sacrifice system performance. Accordingly, the cache combines light and heavy compressors with a decision-making unit to (Continued)

achieve reduced off-chip memory traffic without sacrificing system performance.

20 Claims, 6 Drawing Sheets

(51) Int. Cl.
    *G06F 12/0871*    (2016.01)
    *G06F 12/0897*    (2016.01)

(56) References Cited

U.S. PATENT DOCUMENTS

| | | | |
|---|---|---|---|
| 9,398,587 | B1* | 7/2016 | Kong .................. H04W 72/044 |
| 10,609,418 | B2 | 3/2020 | Gadelrab et al. |
| 11,062,507 | B2* | 7/2021 | DeLaurier ................. G06T 1/60 |
| 11,544,196 | B2 | 1/2023 | SeyedzadehDelcheh et al. |
| 2006/0101206 | A1* | 5/2006 | Wood .................. G06F 12/0802 |
| | | | 711/E12.017 |
| 2012/0272123 | A1 | 10/2012 | Yeh |
| 2014/0250257 | A1 | 9/2014 | Khan et al. |
| 2014/0281344 | A1 | 9/2014 | Shin et al. |
| 2016/0294410 | A1 | 10/2016 | Bhaskar et al. |
| 2020/0007156 | A1 | 1/2020 | Fenney |
| 2020/0241805 | A1* | 7/2020 | Armangau ............. G06F 3/0659 |
| 2021/0134052 | A1* | 5/2021 | DeLaurier ........... G06F 12/0888 |
| 2021/0224205 | A1* | 7/2021 | Dalmatov ........... G06F 11/3452 |
| 2021/0288659 | A1* | 9/2021 | Ghasemazar ....... G06F 12/0886 |
| 2023/0315627 | A1* | 10/2023 | Abali .................. G06F 12/0811 |
| | | | 711/118 |

OTHER PUBLICATIONS

K. Shrivastava and P. Mishra, "Dual Code Compression for Embedded Systems," 2011 24th International Conference on VLSI Design, Chennai, India, 2011, pp. 177-182.*

Alameldeen et al., "Adaptive Cache Compression for High-Performance Processors", 31st Annual International Symposium on Computer Architecture, Jun. 2004, 12 pages.

Arelakis et al., "HyComp: A Hybrid Cache Compression Method for Selection of Data-Type-Specific Compression Methods", 48th Annual International Symposium on Microarchitecture, Dec. 5, 2015, pp. 38-49.

Arelakis et al., "SC2: A Statistical Compression Cache Scheme", ACM SIGARCH Computer Architecture News, Jun. 2014, 12 pages, vol. 42, Issue 3.

Deutsch, Peter, "GZIP file format specification version 4.3", May 1996, 12 pages, Request for Comments: 1952.

Dusser et al., "Zero-Content Augmented Caches", Research Report, RR-6705, Oct. 2008, 19 pages, INRIA, https://hal.inria.fr/inria-00337742/document. [Retrieved Oct. 4, 2019].

Huffman, "A Method for the Construction of Minimum-Redundancy Codes", Proceedings of the IRE, Sep. 1952, pp. 1098-1101, vol. 40, Issue 9, IEEE.

Kim et al., "Bit-Plane Compression: Transforming Data for Better Compression in Many-Core Architectures", 43rd Annual International Symposium on Computer Architecture, Jun. 18, 2016, 12 pages.

M. Milward, J. L. Nunez and D. Mulvaney, "Design and implementation of a lossless parallel high-speed data compression system", in IEEE Transactions on Parallel and Distributed Systems, vol. 15, No. 6, pp. 481-490, Jun. 2004.

P.A. Franaszek, L.A. Lastras-Montano, Song Peng and J. T. Robinson, "Data compression with restricted parsings", Data Compression Conference (DCC'06), 2006, pp. 203-212.

Pekhimenko et al., "Base-Delta-Immediate Compression: Practical Data Compression for On-Chip Caches", 21st International Conference on Parallel Architectures and Compilations Techniques, Sep. 19, 2012, 12 pages, IEEE.

* cited by examiner

RESOURCE-AWARE COMPRESSION

CROSS REFERENCE TO RELATED APPLICATION

This application is a continuation of U.S. patent application Ser. No. 16/725,971, entitled "RESOURCE-AWARE COMPRESSION", filed Dec. 23, 2019, the entirety of which is incorporated herein by reference.

BACKGROUND

This invention was made with Government support under the PathForward Project with Lawrence Livermore National Security, Prime Contract No. DE-AC52-07NA27344, Subcontract No. B620717 awarded by the United States Department of Energy. The United States Government has certain rights in this invention.

DESCRIPTION OF THE RELATED ART

Compression aims to improve cache performance by increasing the effective cache capacity (i.e., cache compression) or by increasing the available network bandwidth by reducing bus traffic (i.e., link compression). Decompression latency is an important metric in the compression algorithm performance since decompression lies in the critical access path. Certain compression techniques introduce several cycles to the read path based on the complexity of the decompression algorithm. This can cause performance degradation in latency-sensitive applications.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing a multi-tiered approach to cache compression are disclosed herein. In one implementation, a cache includes a cache controller, light compressor, and heavy compressor. The decision on which compressor to use for compressing cache lines is made based on resource availability such as cache capacity or memory bandwidth. This allows the cache to opportunistically use complex algorithms for compression while limiting the adverse effects of high decompression latency on system performance. To address the above issue, the cache takes advantage of the heavy compressor for effectively reducing memory bandwidth in high bandwidth memory (HBM) interfaces as long as use of the heavy compressor does not sacrifice system performance. Accordingly, the cache combines light and heavy compressors with a decision-making unit to achieve reduce off-chip memory traffic without sacrificing system performance.

In various implementations, applications can be sensitive to decompression latency and this sensitivity nullifies the advantage of having a high compression ratio. Accordingly, in one implementation, a framework is employed that predicts whether to activate a heavy compressor (HC) for compressing cache lines of the workload. The framework involves integrating a HC with a light compressor (LC) and a decision-making unit. The HC can achieve a high compression ratio at the expense of high decompression latency while the LC negligibly increases latency on the critical path of the memory access.

In one implementation, the framework activates the LC to compress all cache lines. If the LC meets a Compression Ratio Target (CRT) for a given cache line, the proposed framework does not use the HC for the given cache line since the LC provides a high compression ratio with negligible decompression latency. This case happens for many integer workloads that can be compressed by the LC and meet the CRT. However, in one implementation, when the LC does not meet the CRT for the given cache line, the HC compressor is activated. This case happens for many double-precision workloads that cannot easily be compressed by the LC.

In one embodiment, the value of the CRT is chosen so as to minimize the number of last level cache (LLC) misses. If the number of LLC misses is reduced by choosing the HC, the CRT is adaptively relaxed. The higher compression ratio offered by the HC drives down the number of LLC misses. Otherwise, if the number of LLC misses is not reduced by using the HC, the decision-making unit chooses to operate with the LC alone. In other embodiments, the CRT value can be affected by other resources such as power measurements, traffic congestion, and so on.

Since the complexity of the HC incurs added latency and sacrifices system performance, in one implementation, a damping factor is introduced to control the number of times the HC is activated during a stage. Thus, given N cache lines per stage, the number of cache lines compressed by the HC is restricted to a threshold T where T<=N. In one implementation, the value of the threshold T is tuned by the decision-making unit during consecutive stages. For example, for applications that are not sensitive to high decompression latency, T is expected to converge to N. This means that as long as the LC cannot achieve a high compression ratio for a given cache line, the HC is activated to compress the given cache line. In contrast, for other applications that are sensitive to high decompression latency, the value of T ranges between 0 and N.

In one implementation, the decision-making unit profiles the number of cache misses for each stage during runtime. At the end of each stage, the decision-making unit compares the number of cache misses from the current and previous stages. If the number of misses increases from the previous stage to the current stage, the decision-making unit decreases the threshold T. Otherwise, if the number of misses decreases from the previous stage to the current stage, the decision-making unit increases T to get a higher compression ratio for upcoming cache lines.

Figure 1:
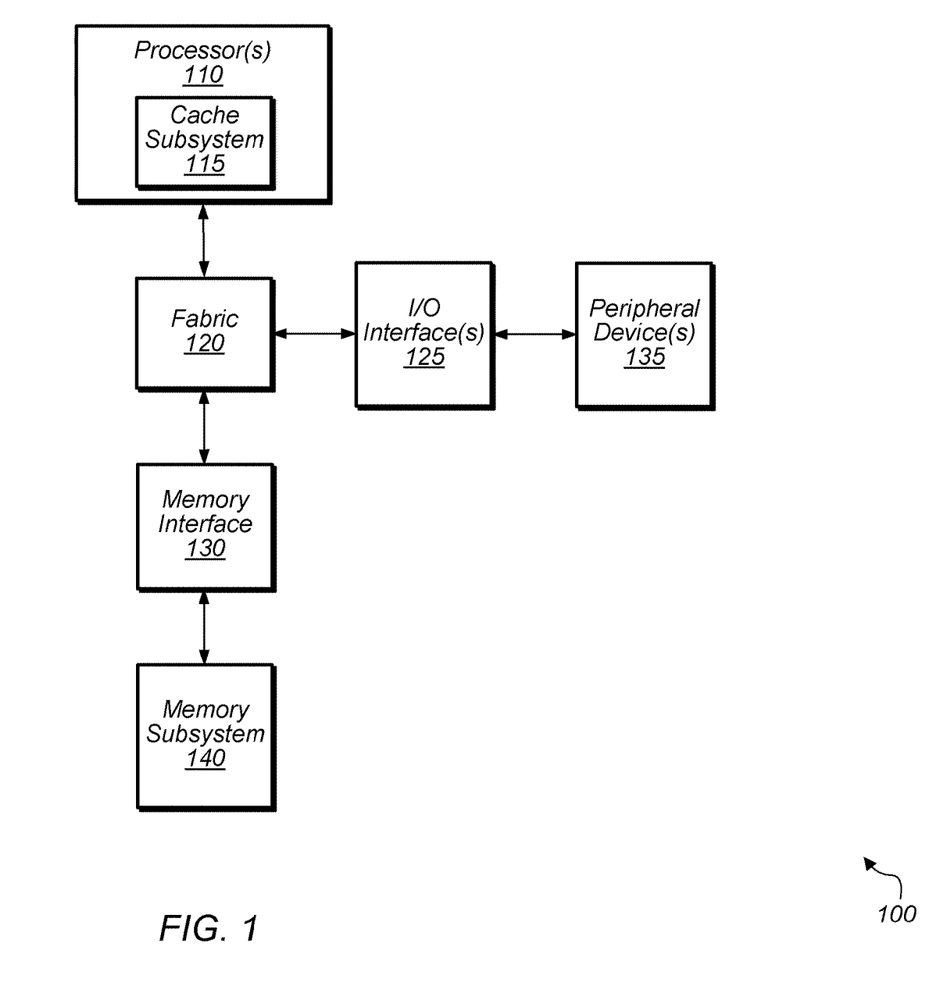
FIG. 1 is a block diagram of one implementation of a computing system.

Referring now to FIG. 1, a block diagram of one implementation of a computing system 100 is shown. In one implementation, computing system 100 includes at least processor(s) 110, fabric 120, input/output (I/O) interface(s) 125, memory interface 130, peripheral device(s) 135, and memory subsystem 140. In other implementations, computing system 100 can include other components, computing system 100 can omit an illustrated component, and/or computing system 100 can be arranged differently. In one implementation, each processor 110 includes a cache subsystem 115. Cache subsystem 115 has any number of cache levels with any of various types of caches which can vary according to the implementation. In some cases, one or more caches in the cache hierarchy of cache subsystem 115 can be located in other locations external to processor(s) 110. In one implementation, one or more caches of cache subsystem 115 include light and heavy compressors which are used to compress cache lines. More details on the techniques used for employing multi-tier compression in a cache will be provided throughout the remainder of this disclosure.

Processors(s) 110 are representative of any number and type of processing units (e.g., central processing unit (CPU), graphics processing unit (GPU), digital signal processor (DSP), field programmable gate array (FPGA), application specific integrated circuit (ASIC)). Memory subsystem 140 includes any number and type of memory devices. For example, the type of memory in memory subsystem 140 can include high-bandwidth memory (HBM), non-volatile memory (NVM), Dynamic Random Access Memory (DRAM), Static Random Access Memory (SRAM), NAND Flash memory, NOR flash memory, Ferroelectric Random Access Memory (FeRAM), or others. I/O interface(s) 125 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral device(s) 135 can be coupled to I/O interface(s) 125. Such peripheral device(s) 135 include (but are not limited to) displays, keyboards, mice, printers, scanners, joysticks or other types of game controllers, media recording devices, external storage devices, network interface cards, and so forth.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more of a given component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
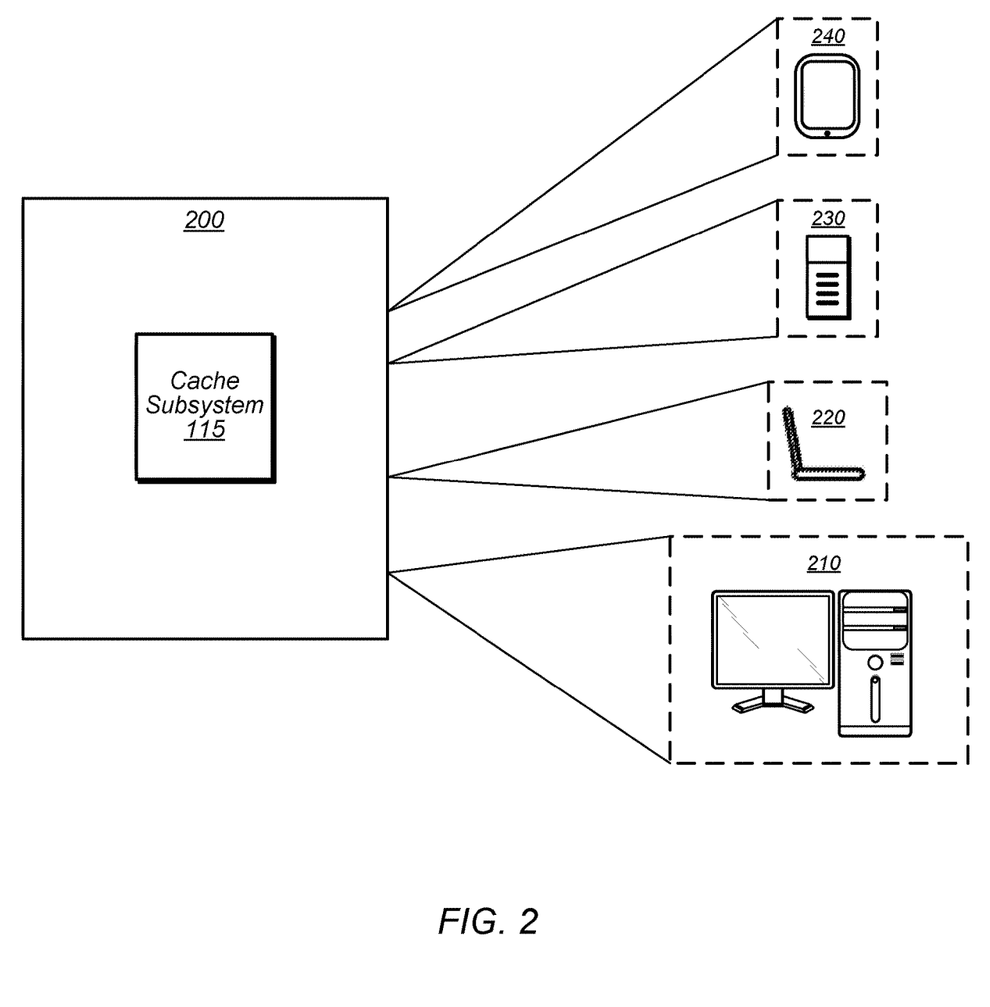
FIG. 2 is a block diagram of one implementation of a computing system.

Turning now to FIG. 2, a block diagram of one implementation of a computing system 200 is shown. As shown, system 200 represents chip, circuitry, components, etc., of a desktop computer 210, laptop computer 220, server 230, mobile device 240, or otherwise. Other devices are possible and are contemplated. In the illustrated implementation, the system 200 includes at least one instance of cache subsystem 115 (of FIG. 1). Although not shown in FIG. 2, system 200 can also include any number and type of other components, such as one or more processors, one or more memory devices, one or more peripheral devices, and so on. Cache subsystem 115 includes any number of cache levels which include light and heavy compressors for compressing data stored therein.

While heavy compressors can achieve higher compression ratios than light compressors, heavy compressors potentially sacrifice system performance when original cache lines are serially retrieved adding extra decompression latency in the critical path. One of the challenges in a multi-tier compression scheme is determining how to opportunistically take advantage of heavy compressors for reducing memory bandwidth while not degrading system performance. In one implementation, a framework is employed that controls the use of the heavy compressor in the compression phase to take advantage of the high compression ratio as long as system performance is not degraded.

There is a trade-off between higher compression ratio and read latency. The trade-off exists due to the resource availability during program execution where the higher compression ratio offsets the latency penalty. For example, in program phases where a large number of last level cache (LLC) misses are observed, allowing higher compression ratios would help by reducing the number of main memory accesses. On the other hand, if using the light compressor algorithm does not result in a large number of cache misses when compared to the heavy compressor, it would be prudent to use the lower decompression latency algorithm. More details regarding multi-tier compression algorithms for compressing cache lines will be provided throughout the remainder of this disclosure.

Figure 3:
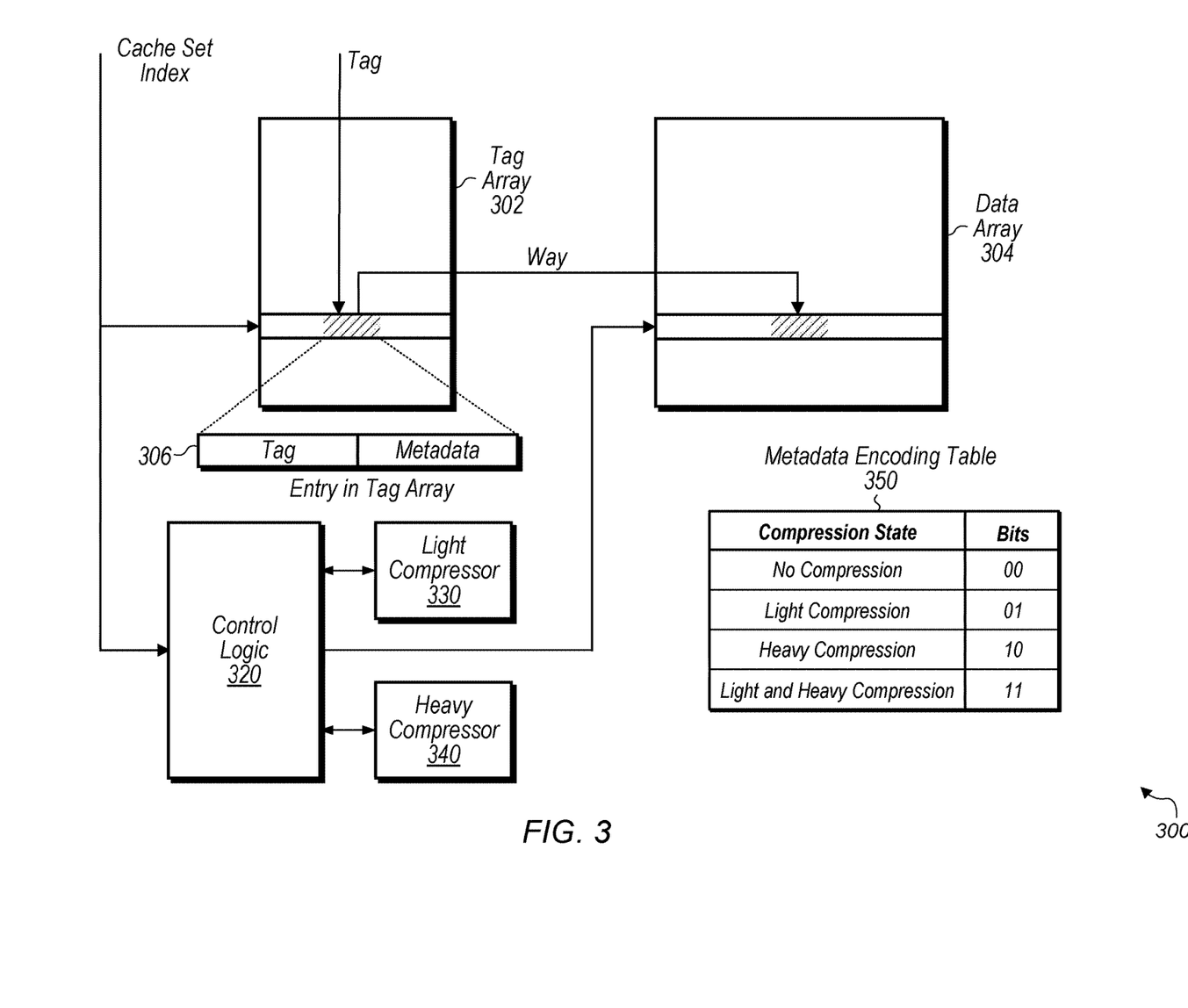
FIG. 3 is a block diagram of one implementation of a cache employing a multi-tier approach to compression.

Referring now to FIG. 3, a block diagram of one implementation of a cache 300 employing a multi-tier approach to compression is shown. In various implementations, cache 300 is a low latency, high bandwidth memory separate from system memory. In some implementations, cache 300 is used as a last-level cache in a cache memory subsystem (e.g., cache subsystem 115 of FIG. 1). In other implementations, cache 300 is another level within the cache memory subsystem.

When a block of data is received by cache 300 for allocation therein, control logic 320 determines whether or not to compress the block of data. It is noted that control logic 320 can also be referred to as a cache controller or decision-making unit. Control logic 320 chooses whether to use light compressor 330, heavy compressor 340, or both light compressor 330 and heavy compressor 340 to compress the block of data. In one implementation, light compressor 330 is a fixed-length encoding based compressor that explores data similarity across equal-sized sub-blocks of cache lines and compresses them by removing redundant data. Generally speaking, light compressor 330 imposes a low compression and decompression latency to the system since many logic operations can be performed in parallel. In contrast, in one implementation, heavy compressor 340 is a variable-length encoding based compressor that uses variable-sized pattern matching for similarity exploration leading to higher compression ratios at the expense of higher compression and decompression latency as compared to light compressor 330. In other implementations, light compressor 330 and/or heavy compressor 340 use other types of compression algorithms for compressing blocks of data received by cache 300.

The choice on which compression scheme to use is based on multiple factors, including, but not limited to, the cache hit rate of cache 300, the number of times heavy compressor 340 has already been used for the current stage, the amount of compression light compressor 330 is able to achieve for the block of data, and the amount of compression heavy compressor 340 is able to achieve for the block of data. For set-associative cache structures, when a cache line is allocated in cache 300, control logic 320 stores a tag and metadata in an entry 306 of tag array 302 in a set which is referenced by the cache set index. Also, when allocating the cache line in cache 300, in one implementation, control logic 320 compresses the block of data using light compressor 330 and determines if the light compressor 330 meets a first compression ratio threshold. If the light compressor 330 meets the first compression ratio threshold, then control logic 320 stores the compressed block of data in a corresponding entry of data array 304. In this case, the metadata field of entry 306 will indicate that only light compressor 330 was used to compress the corresponding data. One example of metadata encodings that can be used in accordance with one implementation are shown in metadata encoding table 350. While FIG. 3 illustrates distinct tag array 302 and data array 304, in other embodiments any suitable storage device may be used for storing tags and data, whether as separate storage entities or combined in a single storage entity. As such, a reference to a "storage device" for storing tags and/or data contemplates separate storage devices (e.g, to separately store tags and data) or a combined storage device.

However, if the compression achieved by light compressor 330 does not meet the first compression ratio threshold, then control logic 320 determines if the heavy compressor 340 has already been used for a threshold number of times in the current stage. As used herein, the term "stage" is defined as a certain number of cache lines being allocated by cache 300. For example, in one implementation, a stage is defined as 10,000 cache lines being allocated by cache 300. In this implementation, when 10,000 cache lines have been allocated by cache 300, one stage ends and a new stage begins with the count of cache lines starting over again. In other implementations, a stage can correspond to other numbers of cache lines.

If the heavy compressor 340 has already been used for the threshold number of times in the current stage and the light compressor 330 was unable to meet the first compression ratio target, then control logic 320 stores the block of data in an uncompressed state. Otherwise, if the heavy compressor 340 has been used for fewer than the threshold number of times in the current stage, then control logic 320 compresses the block of data using heavy compressor 340. If the compression achieved by heavy compressor 340 meets a second compression ratio threshold, then control logic 320 stores the compressed block of data generated by heavy compressor 340 in the corresponding entry of data array 304. Also, control logic 320 increments a counter tracking the number of cache lines compressed by heavy compressor 340 in the current stage. Otherwise, if the compression achieved by heavy compressor 340 does not meet the second compression ratio threshold, then control logic 320 stores the original, uncompressed block of data in the corresponding entry of data array 304.

Depending on the implementation, control logic 320 either uses heavy compressor 340 to compress the original block of data or control logic 320 uses heavy compressor 340 to compress the compressed version of the block of data that was generated by light compressor 330. These different scenarios are encoded into the metadata field of the entry 306 in tag array 302 using the encodings shown in metadata encoding table 350. For example, in one implementation, metadata bits "10" indicate that heavy compressor 340 was used to compress the original block of data while metadata bits "11" indicate that the original block of data was compressed with light compressor 330 to generate a first compressed block and then the first compressed block was compressed with heavy compressor 340 to generate a second compressed block.

In another implementation, heavy compressor 340 and light compressor 330 are applied to different parts of the cache line. For example, because of low similarity in mantissa bits of 64-bit floating point (FP) values, light compressor 330 is typically not able to capture similarity across mantissa bits. In contrast, heavy compressor 340 uses variable-size pattern matching to more easily compress the mantissa bits. Also, because of the high similarity across sign and exponent bits in 64-bit FP values, light compressor 330 is used to compress these specific bits. In this case, the criterion of meeting the compression ratio target by light compressor 330 is not enforced. Instead, if light compressor 330 compresses sign and exponent bits and the number of calls by heavy compressor 340 for the current stage is less than the threshold number, heavy compressor 340 is used for compressing mantissa bits. It is noted that the above approaches provide various examples of a multi-tier compression techniques in accordance with some implementations. In other implementations, other approaches that rely on three or more different types of compressors can be used for compressing data.

Figure 4:
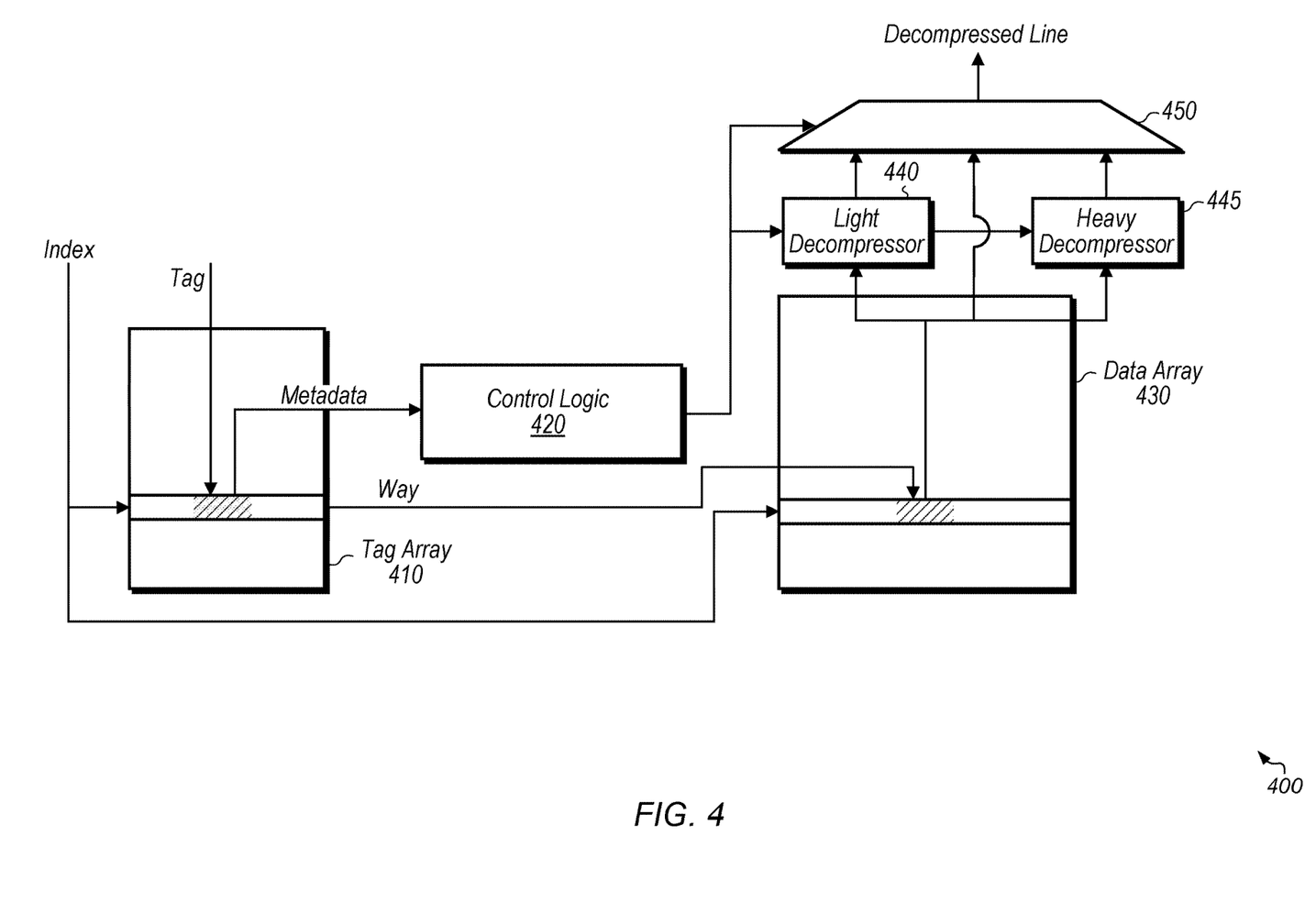
FIG. 4 is a block diagram of one implementation of using a multi-tier decompression approach in a cache.

Turning now to FIG. 4, a block diagram of one embodiment of using a multi-tier decompression approach for cache 400 is shown. FIG. 4 illustrates the techniques used for decompressing cache lines stored in cache 400. When a read request is received by cache 400, the index portion of the address is used to select a set of tag array 410. The tag portion of the address is used to locate a matching entry in tag array 410. If the lookup results in a match, the metadata is retrieved from the matching entry and conveyed to control logic 420. In one implementation, the metadata indicates which type of compression was used to compress the corresponding cache line stored in data array 430. Also, an indication of the way is conveyed to data array 430 to retrieve the corresponding cache line in data array 430 from the set identified by the index portion of the address of the request.

The retrieved cache line is conveyed to light decompressor 440 and heavy decompressor 445. In one implementation, light decompressor 440 decompresses cache lines that were compressed with a light compressor (e.g., light compressor 330 of FIG. 3) while heavy decompressor 445 decompresses cache lines that were compressed with a heavy compressor (e.g., heavy compressor 340 of FIG. 3). Control logic 420 sends control signals to light decompressor 440 and heavy decompressor 445 to activate one or both of these decompressors based on the value of the metadata in the matching entry of tag array 410. Also, control logic 420 sends a select signal to multiplexer 450 to select the output of light decompressor 440, the original, uncompressed cache line from the corresponding set and way of data array 430, or the output of heavy decompressor 445. In cases where the metadata indicates that the cache line was compressed using both a light compressor and a heavy compressor, the output of light decompressor 440 is passed as an input to heavy decompressor 445. The output of multiplexer 450 is the decompressed cache line which is provided to the requestor (e.g., processor core).

It should be understood that FIG. 4 represents one example of techniques that can be used for decompressing cache lines that were compressed using a multi-tier compression approach. In other implementations, other arrangements of components can be employed for decompressing cache lines that were compressed using a multi-tier compression approach. For example, in another implementation, cache 400 includes a single decompression unit which is able to decompress cache lines that were compressed with a light compressor as well as cache lines that were compressed with a heavy compressor. In this implementation, control logic 420 forwards the metadata for a given cache line to the decompression unit so that the decompression unit knows which type of decompression scheme to use for decompressing the given cache line.

Figure 5:
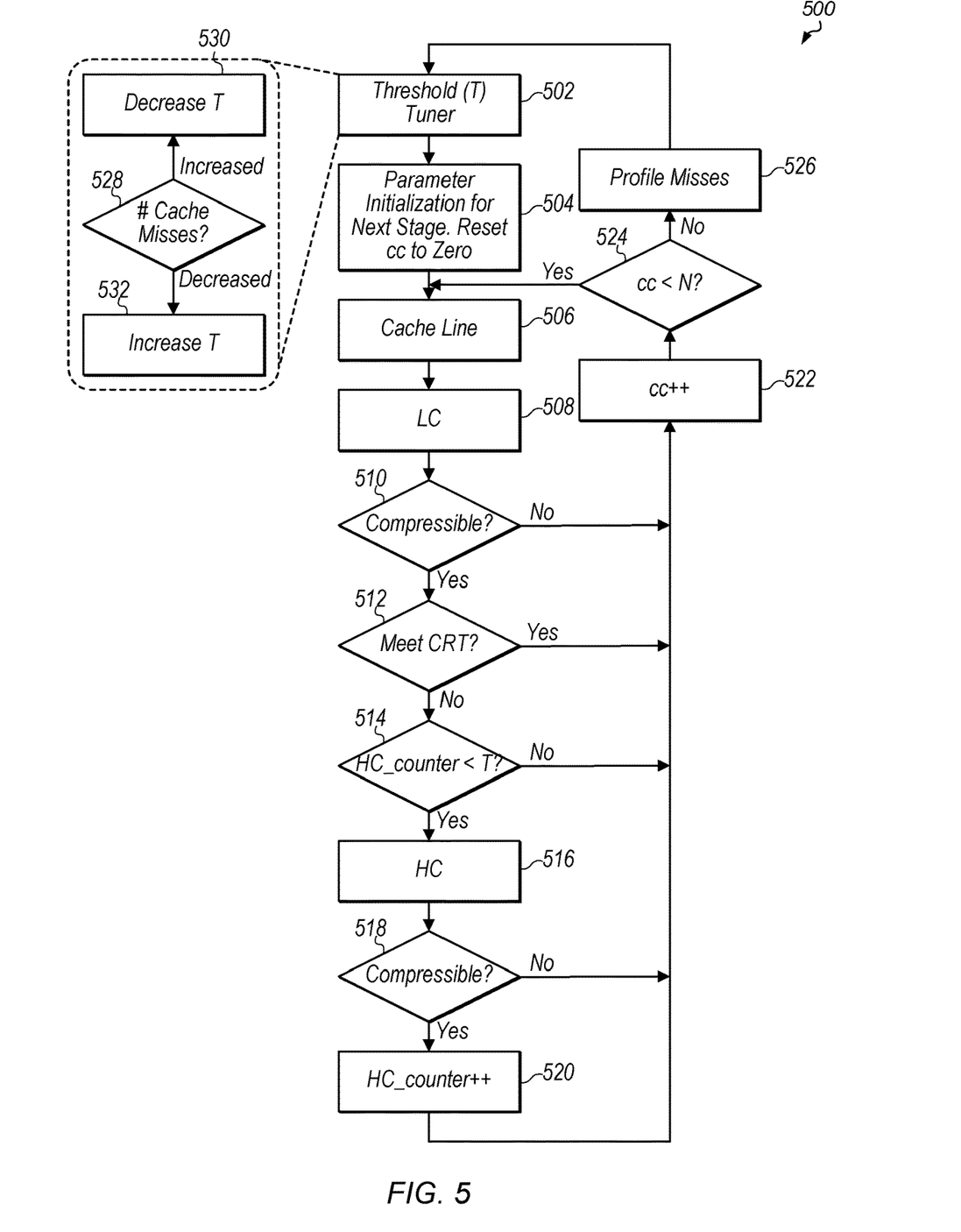
FIG. 5 is a generalized flow diagram illustrating one implementation of a method for employing a multi-tier approach to compression in a cache.
Figure 6:
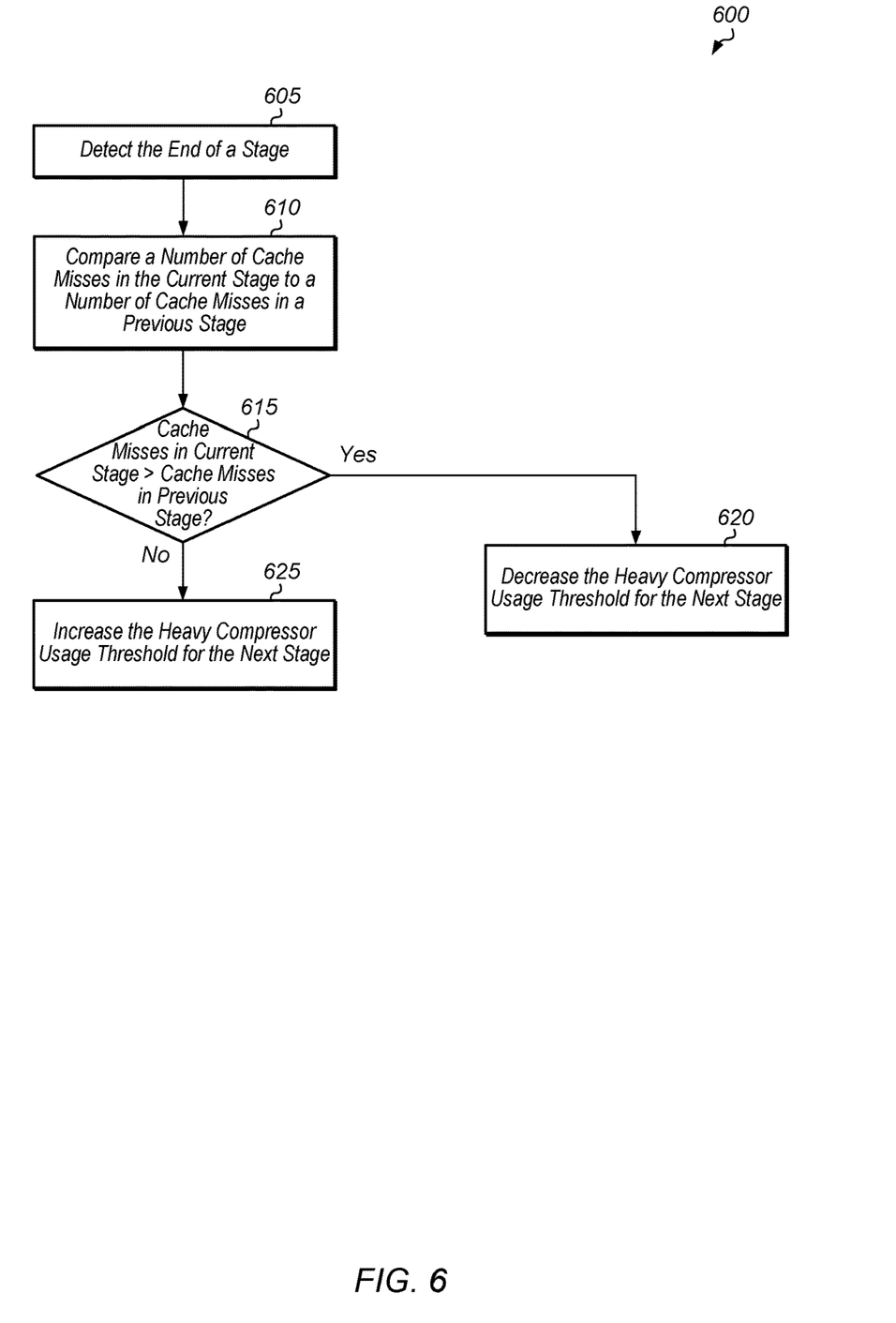
FIG. 6 is a generalized flow diagram illustrating one implementation of a method for adjusting a heavy compressor usage per stage threshold.

Referring now to FIG. 5, one implementation of a method 500 for employing a multi-tier approach to compression in a cache is shown. For purposes of discussion, the steps in this implementation and those of FIG. 6 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A cache receives data to be allocated as a cache line in the cache (block 506). In response to receiving the data, the cache controller compresses the cache line with a light compressor (LC) (block 508). As used herein, a "light compressor" is defined as a compressor using a relatively low-latency approach for compressing data with relatively low complexity and typically achieving a relatively low compression ratio. It is noted that the "light compressor" can also be referred to herein as a "first compressor". Next, the cache controller determines if the data is compressible by the light compressor (conditional block 510). If the data is compressible by the light compressor (conditional block 510, "yes" leg), then the cache controller determines if the light compressor meets a compression ratio target for the data (conditional block 512). If the data is not compressible by the light compressor (conditional block 510, "no" leg), then the cache controller increments a cache line counter (cc) (block 522). Then, the cache controller determines if the cache line counter is less than a threshold "N" (conditional block 524). If the cache line counter is less than the threshold "N" (conditional block 524, "yes" leg), then method 500 returns to block 506 and waits for the next block of data to be received by the cache. Otherwise, if the cache line counter is equal to the threshold "N" (conditional block 524, "no" leg), then the cache controller profiles the misses for the cache (block 526). It is noted that the value of the threshold "N" determines the duration of a stage in terms of numbers of cache lines processed by the cache.

If the light compressor meets the compression ratio target for the data (conditional block 512, "yes" leg), then the cache controller stores the compressed block using the light compressor and increments the cache line counter (block 522). Otherwise, if the light compressor does not meets the compression ratio target for the data (conditional block 512, "no" leg), then the cache controller determines if the heavy compressor counter (HC_counter) is less than a threshold "T" (conditional block 514). The heavy compressor counter tracks the number of cache lines that have been compressed by a heavy compressor during the current stage. The threshold "T" is the maximum number of cache lines that are allowed to be compressed by the heavy compressor for the current stage.

If the heavy compressor counter (HC_counter) is equal to the threshold "T" (conditional block 514, "no" leg), then the cache controller stores the data in its original, uncompressed state in the cache and increments the cache line counter (block 522). If the heavy compressor counter (HC_counter) is less than the threshold "T" (conditional block 514, "yes" leg), then the cache controller compresses the received data with the heavy compressor (block 516). As used herein, a "heavy compressor" is defined as a compressor using a relatively high-latency approach for compressing data with relatively high complexity and typically achieving a relatively high compression ratio. It is noted that the "heavy compressor" can also be referred to herein as a "second compressor". If the data is compressible by the heavy compressor (conditional block 518, "yes" leg), then the cache controller stores the compressed version of the data generated by the heavy compressor and increments the heavy compressor counter (block 520). After block 520, the cache controller increments the cache line counter (block 522). If the data is not compressible by the heavy compressor (conditional block 518, "no" leg), then the cache controller stores the original, uncompressed data in the cache and increments the cache line counter (block 522). It is noted that in other implementations, other numbers of compressors besides two can be used in method 500.

After profiling the cache misses in block 526, method 500 tunes the threshold "T" (block 502). The threshold "T" is the maximum number of cache lines that are allowed to be compressed by the heavy compressor per stage. One example of tuning the threshold "T" is shown to the left of block 502. For example, in one implementation, if the number of cache misses has increased in the current stage from the previous stage (conditional block 528, "increased" leg), then the cache controller decreases the threshold "T" (block 530). Otherwise, if the number of cache misses has decreased in the current stage from the previous stage (conditional block 528, "decreased" leg), then the cache controller increases the threshold "T" (block 532). If the number of cache misses in the current stage is equal to the number of cache misses in the previous stage, then the threshold "T" remains the same. After blocks 530 and 532, the cache controller initializes parameters (e.g., resets the heavy compressor counter to zero) for the next stage and resets the cache line counter "cc" to zero (block 504). After block 504, the cache controller waits to receive data to be allocated in the cache (block 506).

Turning now to FIG. 6, one implementation of a method 600 for adjusting a heavy compressor usage per stage threshold is shown. The end of a stage is detected by a control unit (block 605). In one implementation, the end of a stage is reached when a given number of cache lines have been allocated in the cache since the end of the previous stage. The value of the given number of cache lines can vary from implementation to implementation. In one implementation, the cache represents a last level cache (LLC) of a processor (e.g., GPU, CPU).

Next, the control unit compares a number of misses for the cache in the current stage to a number of misses for the cache in a previous stage (block 610). If the number of misses for the cache in the current stage is greater than the number of misses for the cache in the previous stage (conditional block 615, "yes" leg), then the control unit decreases the heavy compressor usage threshold for the next stage (block 620). The heavy compressor usage threshold determines the maximum number of cache lines that are allowed to be compressed by the heavy compressor per stage. In some cases, the heavy compressor usage threshold is decreased in linear proportion to the difference between the number of misses in the current stage versus the previous stage. In other cases, the heavy compressor usage threshold is decreased by a fixed amount in block 620. Otherwise, if the number of misses for the cache in the current stage is less than the number of misses for the cache in the previous stage (conditional block 615, "no" leg), then the control unit increases the heavy compressor usage threshold for the next stage (block 625). After blocks 620 and 625, method 600 ends. If the number of misses for the cache in the current stage is the same as the number of misses for the cache in the previous stage, then the value of the heavy compressor usage per stage threshold can stay the same.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A method comprising:
   compressing data, with first compression circuitry, data to generate compressed data; and
   compressing the compressed data, with second compression circuitry, based at least in part on the second compression circuitry having been used a number of times that is less than a threshold number.

2. The method as recited in claim 1, further comprising modifying the threshold number based at least in part on a cache miss rate.

3. The method as recited in claim 2, further comprising adjusting the threshold number, responsive to detecting an end of a stage.

4. The method as recited in claim 3, wherein the end of the stage corresponds to allocation of a given number of cache lines.

5. The method as recited in claim 4, further comprising selecting one of the first compression circuitry and the second compression circuitry for use when compressing data, based at least in part on comparing a cache miss rate of a current stage to a cache miss rate of a previous stage.

6. The method as recited in claim 1, wherein the number of times the second compression circuitry has been used corresponds to a given number of cache lines.

7. The method as recited in claim 1, further comprising increasing the threshold number, responsive to a decrease in a cache miss rate.

8. The method as recited in claim 7, further comprising decreasing the threshold number, responsive to an increase in the cache miss rate.

9. A cache comprising:
   first compression circuitry configured to compress data;
   second compression circuitry configured to compress data with a higher compression level than the first compression circuitry; and
   control circuitry configured to compress data using the second compression circuitry, based at least in part on the second compression circuitry having been used a number of times that is less than a threshold number.

10. The cache as recited in claim 9, wherein the threshold number is variable based at least in part on a cache miss rate.

11. The cache as recited in claim 10, wherein the control circuitry is configured to adjust the threshold number, responsive to detection of an end of a stage.

12. The cache as recited in claim 11, wherein the end of the stage corresponds to allocation of a given number of cache lines.

13. The cache as recited in claim 12, wherein the control circuitry is configured to select the second compression circuitry for use when compressing data, based at least in part on a comparison of a cache miss rate of a current stage to a cache miss rate of a previous stage.

14. The cache as recited in claim 9, wherein the number of times the second compression circuitry has been used corresponds to a given number of cache lines.

15. The cache as recited in claim 9, wherein the control circuitry is configured to increase the threshold number, responsive to a decrease in a cache miss rate.

16. The cache as recited in claim 15, wherein the control circuitry is configured to decrease the threshold number, responsive to an increase in the cache miss rate.

17. A computing system comprising:
   a memory interface configured to be coupled to a memory; and
   a processor comprising:
      first compression circuitry configured to compress data;
      second compression circuitry configured to compress data with a higher compression level than the first compression circuitry; and
      control circuitry configured to compress data using the second compression circuitry, based at least in part on a number of times the second compression circuitry having been used a number of times that is less than a threshold number.

18. The computing system as recited in claim 17, wherein the processor is configured to store data compressed by the first compression circuitry and data compressed by the second compression circuitry in a cache.

19. The computing system as recited in claim 17, wherein the processor is configured to modify the threshold number based at least in part on a cache miss rate.

20. The computing system as recited in claim 19, wherein processor is configured to:
  increase the threshold number, responsive to a decrease in a cache miss rate; and
  decrease the threshold number, response to an increase in the cache miss rate.

\* \* \* \* \*

UNITED STATES PATENT AND TRADEMARK OFFICE
CERTIFICATE OF CORRECTION

| | | |
|---|---|---|
| PATENT NO. | : 12,130,741 B2 | Page 1 of 1 |
| APPLICATION NO. | : 18/058534 | |
| DATED | : October 29, 2024 | |
| INVENTOR(S) | : SeyedzadehDelcheh et al. | |

It is certified that error appears in the above-identified patent and that said Letters Patent is hereby corrected as shown below:

In the Claims

Column 9, Claim 1, Line 50-51, please delete "circuitry, data to generate" and insert -- circuitry, to generate --.

Signed and Sealed this
Eighteenth Day of March, 2025

Coke Morgan Stewart
*Acting Director of the United States Patent and Trademark Office*